United States Patent
Neff et al.

[11] Patent Number: 6,076,875
[45] Date of Patent: Jun. 20, 2000

[54] GRIPPER FOR LINEAR VOICE COIL ACTUATOR

[75] Inventors: Edward A. Neff, Rancho Santa Fe; Chia-Tung Chen, Fullerton; Hans Portegies, Temecula; Toan Vu, San Diego; Tomas T. Simunovic; Ninh Nguyen, both of Vista, all of Calif.

[73] Assignee: Systems, Machines, Automation Components, Corporation, Carlsbad, Calif.

[21] Appl. No.: 09/397,987

[22] Filed: Sep. 16, 1999

Related U.S. Application Data

[63] Continuation-in-part of application No. 09/025,399, Feb. 18, 1998, abandoned.

[51] Int. Cl.[7] .................. B25J 15/08; B25J 19/02
[52] U.S. Cl. ............ 294/88; 294/119.1; 294/907; 414/751.1
[58] Field of Search ............... 294/2, 88, 119.1, 294/907; 901/33–36, 46; 414/749–751

[56] References Cited

U.S. PATENT DOCUMENTS

| | | | |
|---|---|---|---|
| 3,648,854 | 3/1972 | Potter | 414/751 |
| 3,709,379 | 1/1973 | Kaufeldt . | |
| 3,958,740 | 5/1976 | Dixon . | |
| 4,042,122 | 8/1977 | Espy et al. | 414/751 |
| 4,579,380 | 4/1986 | Zaremsky et al. | 294/119.1 |
| 4,653,794 | 3/1987 | Atlas . | |
| 4,714,400 | 12/1987 | Barnett et al. | 414/751 |
| 4,759,124 | 7/1988 | Snyder et al. . | |
| 4,783,107 | 11/1988 | Parker et al. | 294/88 |
| 4,809,430 | 3/1989 | Maruyama et al. . | |
| 4,872,803 | 10/1989 | Asakawa | 294/119.1 |
| 4,913,613 | 4/1990 | Hirschmann . | |
| 5,055,725 | 10/1991 | La Sota . | |
| 5,161,847 | 11/1992 | Yakou | 901/36 |
| 5,175,456 | 12/1992 | Neff et al. . | |
| 5,206,985 | 5/1993 | Tsukihashi et al. . | |
| 5,251,946 | 10/1993 | Rossmeisl et al. . | |
| 5,310,064 | 5/1994 | Neff et al. . | |
| 5,315,189 | 5/1994 | Neff et al. . | |
| 5,317,222 | 5/1994 | Neff et al. . | |
| 5,446,323 | 8/1995 | Neff et al. . | |
| 5,451,824 | 9/1995 | Sieber et al. . | |
| 5,458,387 | 10/1995 | Conway et al. . | |
| 5,562,320 | 10/1996 | Bloomberg et al. | 294/119.1 |
| 5,669,652 | 9/1997 | Reising et al. | 901/36 |
| 5,716,187 | 2/1998 | Costa | 414/751 |

FOREIGN PATENT DOCUMENTS

| | | | |
|---|---|---|---|
| 1-321188 | 12/1989 | Japan | 901/36 |
| 937-140 | 9/1982 | U.S.S.R. | 901/36 |
| 1007-968 | 3/1983 | U.S.S.R. | 294/88 |
| 1090-548 | 5/1984 | U.S.S.R. | 294/88 |
| 1248-796 | 8/1986 | U.S.S.R. | 901/36 |
| 1484-709 | 6/1989 | U.S.S.R. | 294/88 |

*Primary Examiner*—Dean J. Kramer
*Attorney, Agent, or Firm*—Nydegger & Associates

[57] ABSTRACT

The present invention is a gripper for use in combination with a machine for repositioning a component. Structurally, the present invention includes a housing formed with a chamber. A fixed-pole housing magnet is positioned inside of the chamber. A pair of grips are slidingly mounted for movement relative to the housing. Each grip is partially contained in the chamber and partially projects from the housing. An electromagnetic coil is attached to each grip. Functionally, the gripper is positioned with an assembly component between the grips. A separate electric current is then passed through each of the electromagnetic coils mounted on each of the respective grips. The electric current causes each electromagnetic coil to generate a magnetic field which interacts with the housing magnet. The interaction between the magnetic fields generated by the electromagnetic coils and the housing magnet creates a force on each grip, causing each grip to move translationally to hold, or squeeze, the component. The machine may then be utilized to reposition the gripper and the component.

20 Claims, 4 Drawing Sheets

GRIPPER FOR LINEAR VOICE COIL ACTUATOR

This application is a continuation-in-part of application Ser. No. 09/025,399, filed Feb. 18, 1998, now abandoned. The contents of application Ser. No. 09/025,399 are incorporated herein by reference.

FIELD OF THE INVENTION

The present invention pertains generally to machines which are useful for the automated assembly of products. More specifically, the present invention pertains to electric actuators which are useful for inspecting, assembling, and positioning component parts in a product assembly process. The present invention is particularly, but not exclusively useful as an actuator gripper which selectively grasps and precisely positions irregular or fragile components during an automated procedure.

BACKGROUND

Numerous devices which are useful for the automated assembly of products have been successfully used for many years. In each instance, automated assembly devices have been employed with a view toward increasing the efficiencies and accuracies of the methods, procedures, and processes which are followed during the manufacture and the assembly of a completed product. Indeed, the vast majority of consumer products are now manufactured on assembly lines which incorporate automated assembly devices.

It is easy to appreciate that as the complexity of a manufactured product increases, there may also be a commensurate increase in the complexity of the machines that are required to manufacture the product. For example, many products, including printed circuit boards, require that small assembly components be accurately positioned and then inserted. The process of positioning becomes increasingly difficult as smaller assembly components are used, where the assembly components have irregular or varying shapes, and/or where the components are fragile.

One type of device which has been successfully utilized as part of an automated assembly system is the linear voice coil actuator. Actuators of this type include an electromagnetic coil and a fixed-pole magnet. Electric current applied to the electromagnetic coil causes the coil to generate a magnetic field. The magnetic field generated by the electromagnetic coil interacts with the magnetic field generated by the fixed-pole magnet and causes the electromagnetic coil to move translationally with respect to the fixed-pole magnet. A gripper of some type is attached to the coil and moves with the moving coil. In use, the gripper is positioned over the component and advanced, under control of the coil, until contact between the gripper and the component has been established. The gripper is then caused to grasp the component. Subsequently, the gripper and component may then be translationally repositioned under control of the electromagnetic coil Additionally, the entire actuator, gripper, and component may be moved laterally, rotated, or otherwise relocated to further reposition the component.

In general, these linear voice coil actuators have proven to be an effective way for repositioning components. However, traditional gripper designs have not proven to be entirely satisfactory for asymmetric or irregularly shaped components. This problem is compounded by variations in the physical dimensions of successive components and/or variations in the pick-up position of components. In such cases, traditional gripper designs may be unable to effectively adapt to the differing components and differing positions, thereby making the components difficult to grasp and difficult to accurately manipulate.

Another potential difficulty arises when a particular process requires that a component be given a precise lateral alignment prior to insertion or other manipulation. Examples of processes of this type include the assembly of microelectronics, which require that extremely small packages be laterally located with great precision. Traditional grippers, however, include no apparatus specifically designed to allow components to be laterally repositioned in this fashion. Instead, lateral repositioning is traditionally accomplished by selectively moving the entire actuator and the component. In some cases, however, the size of the moving actuator, which may be much larger than the component itself, makes it difficult to achieve the accuracy required for a particular assembly operation.

Yet another potential difficulty arises when particularly fragile components must be picked up and manipulated. In many cases, where a traditional actuator is used in combination with a traditional gripper, there may be no way to determine the force applied by the gripper as the gripper grasps the component. As a result, fragile components may be damaged if an overabundance of force is applied by the gripper during the assembly process.

In light of the above, it is an object of the present invention to provide an actuator and gripper for use in an automated process which is adaptable to grasp irregular components. It is another object of the present invention to provide an actuator and gripper for use in an automated process which adapts to grasp components of varying dimensions, i.e., different sized components. Yet another object of the present invention is to provide an actuator and gripper for use in an automated process which provides accurate lateral positioning of the component. Another object of the present invention is to provide an actuator and gripper for use in an automated process which may be used in combination with fragile components. Another object of the present invention is to provide an actuator and gripper for use in an automated process which determines whether a component has been accurately and properly engaged by the actuator and gripper. Still another object of the present invention is to provide an actuator and gripper for use in an automated process which is relatively simple to use, is relatively easy to manufacture and is comparatively cost effective.

SUMMARY

The present invention is directed to a gripper which satisfies these needs. The gripper includes a first grip, a second grip, means attached to the first grip for selectively creating a first magnetic field for moving the first grip and means for moving the first and second grips to reposition the component. Because of the unique design of the present invention, the first grip and second grip can be individually moved and individually controlled to grasp irregular components. Further, the first and second grips can be precisely moved to laterally reposition the component. Additionally, the force on the first and second grips can be precisely controlled so that the present gripper can be used to grasp and move fragile components while maintaining a predetermined force on the component being moved.

Structurally, the gripper typically includes a housing which is formed to establish an internal chamber having a slot-shaped aperture. The first grip and second grip are mounted to be partially contained within the chamber and to partially project from the slot-shaped aperture. Further, the first and second grips are slidingly moveable on a rail which is secured to the housing. The rail defines an axis of translational movement. Functionally, this allows the first grip and the second grip to be moved translationally relate to each other along the axis of translational movement.

The present invention also includes a housing magnet positioned within the chamber. Functionally, the housing magnet works to establish a housing magnetic field within the chamber of the housing. Preferably, housing magnetic field is stationary relative to the housing and is aligned with the axis of translational movement so that the north and south poles of the magnetic field lie along the axis of translational movement. The housing magnetic field may be achieved with various types and configurations of magnets. For example, an oblong, rare-earth type magnet can be utilized. In an alternate embodiment, two magnets can be used.

The present invention also includes a first electromagnetic coil and a second electromagnetic coil which may be positioned in the same housing or in separate housings. The first electromagnetic coil is attached to the first grip and the second electromagnetic coil is attached to the second grip. The first and second electromagnetic coils are connected separately through a controller to a source of electric power. This allows a separate electric current to be selectively passed through the first and second electromagnetic coils. Functionally, passage of the electric current through either the first or second electromagnetic coil causes the coil to produce a variable magnetic field. In the case of the first electromagnetic coil, this magnetic field is referred to as the first magnetic field. In the case of the second electromagnetic coil, the magnetic field is referred to as the second magnetic field.

The strength and orientation of both the first and second magnetic fields may be selectively controlled by adjusting the electric current passing through the first and second electromagnetic coils. Importantly, the first and second magnetic fields interact independently or in concert with the housing mb 553533.00agnetic field described above. As a result, a force can be create d on the first electromagnetic coil and a force can be created on the second electromagnetic coil. The strength and orientation of these respective forces is controlled by adjusting the electric current passing through the first and second electromagnetic coils.

The forces created on the first and second electromagnetic coils are applied to the first and second grips, respectively. The result of these forces is that each of the grips moves along the axis of translational movement. In this fashion, by selectively passing electric currents through the first and second electromagnetic coils, the first grip and the second grip may be selectively positioned along the axis of translational movement. It follows, then, that components that are positioned between the first and second grips may be selectively held, or squeezed, between the grips. Further, the holding action may be selectively controlled by adjusting the electric current passing through the first and second electromagnetic coils.

In some cases it may be desirable to refine the basic action described in the preceding paragraphs. One such refinement is the inclusion of one or more position sensors which optically encode the translational position of the first and second grips along the axis of translational movement or the rail. Output from these position sensor(s) can be used to accurately control the electric currents applied to the first and second electromagnetic coils to accurately grip and position the component.

Another refinement is to add one or more force sensors which encode the orientation and magnitude of the force generated by the first and second electromagnetic coils. Output from the force sensors can be used to determine the magnitude of the holding or squeezing forces applied to the component and may be used to more accurately control the electric currents applied to the first and second electromagnetic coils. This feature is particularly useful with fragile components to prevent the application of excessive force to the component during gripping.

For operation of the present invention, the gripper is attached to the means for moving both the first and second grips, i.e., a machine which includes a linear voice coil actuator. The machine is then used to position the gripper so that a component is located between the first and second grips. The controller is then used to pass a current through the first electromagnetic coil and a separate current through the second electromagnetic coil. The application of the electric currents to the first and second electromagnetic coils causes the first and second grips to move translationally to hold, or squeeze the component. Importantly, because of this unique configuration, the grips can grasp irregularly shaped, off-centered and/or fragile components.

Once the component is held by the gripper, the controller can make adjustments to the electric currents passing though the first and second electromagnetic coils. For example, the currents can be adjusted so that the first and second grips, with the component held in between, move translationally in concert. The concerted movement of the first and second grips allows the gripper to make adjustments in the lateral location of the component by moving the first and second grips along a substantially linear path. The machine may also be used to relocate the gripper and component or the entire assembly of the machine, gripper and component may be further relocated by any means known in the art.

A refinement to the present invention which will allow for the relocation of the gripper can be made by mounting the gripper on a transporter. Specifically, the purpose of such a transporter would be to move the gripper in a manner that will give a wider range of motion to the grips. In one embodiment, the transporter can include a first rail on which the gripper is slidably mounted. This particular structure will allow for a reciprocal movement of the entire gripper back and forth in directions substantially parallel to the axis of translational movement. Further, the transporter can include a second rail which is oriented substantially perpendicular to the first rail. By slidably mounting the first rail on the second rail, the transporter can be moved in directions substantially perpendicular to the axis of translational movement. Thus, in addition to its grasping function, the gripper itself can be moved by the transporter in directions which give a wider range of motion to the grips of the gripper.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
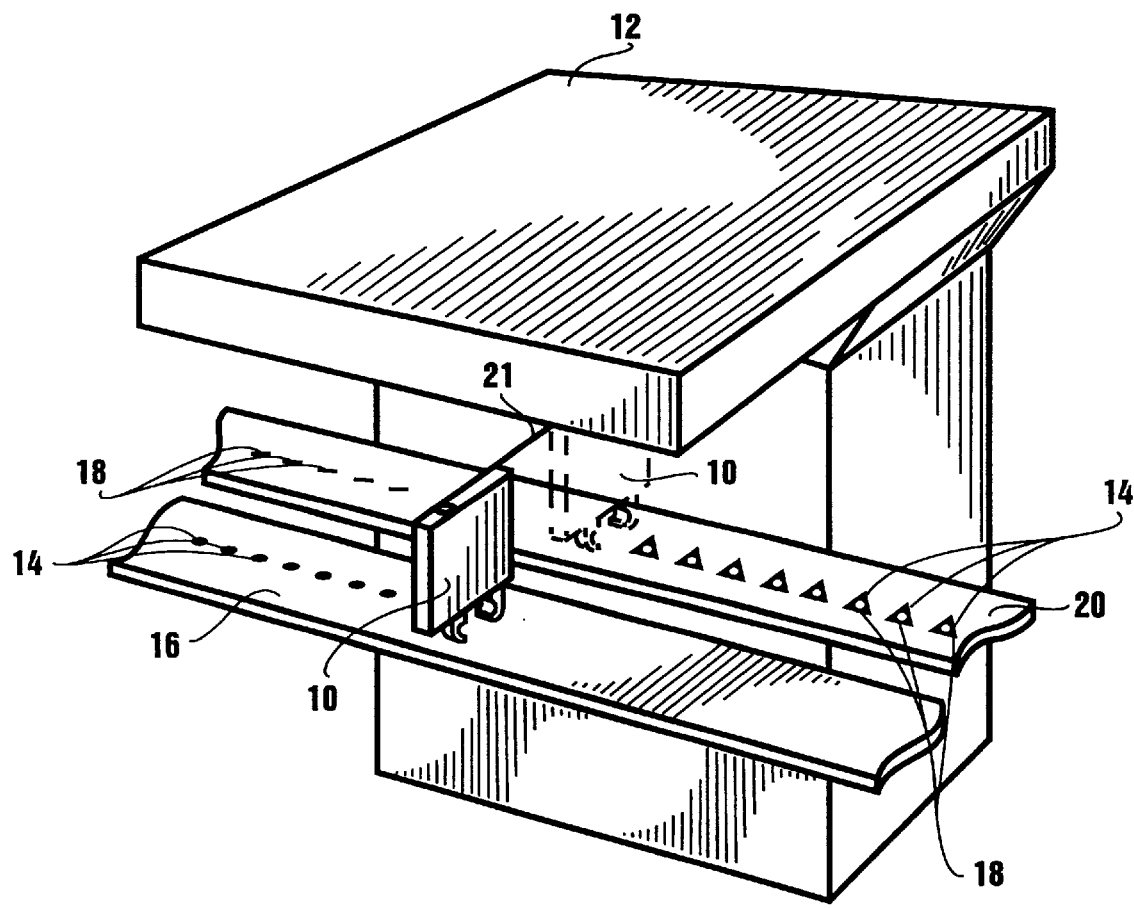
FIG. 1 is a perspective view of a device having features of the present invention.

Referring initially to FIG. 1, a gripper 10 having features of the present invention, for moving and positioning a component 14 is shown operatively mounted on an automated assembly machine 12. Initially, the gripper 10 is shown picking up a component 14 from a conveyor 16. Thereafter, the machine 12 transports the gripper 10 and component 14 to a position wherein the gripper 10 (shown in phantom) releases the component 14 into engagement with another product component 18. After their assembly, the combination of components 14 and 18 is then taken by a conveyor 20 to a subsequent workstation where it is packaged or further combined with other components (not shown).

As far as the gripper 10 and its operation is concerned, it is to be appreciated that the machine 12 shown in FIG. 1 is only exemplary. Indeed, the gripper 10 can be mounted to a machine which includes a plurality of actuators for movement of the gripper 10 between a plurality of pre-selected positions. For example, the gripper 10 can be attached to one or more actuators 21, i.e., linear voice coil actuators, which can selectively move, rotate, and/or reposition the gripper 10. Because of the unique design provided herein, the gripper 10 can be used to assemble fragile items including computer chips and eyeglasses. Alternately, for example, the gripper 10 can be used to grab items, such as test tubes containing potentially dangerous test specimens for an automated clinical analyzer.

Figure 2:
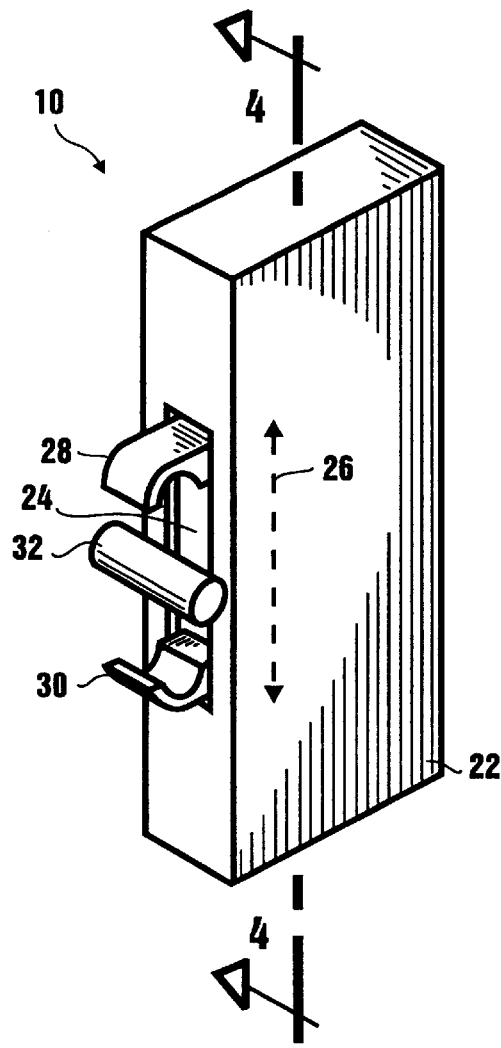
FIG. 2 is an isometric view of a gripper having features of the present invention shown in an open configuration.
Figure 3:
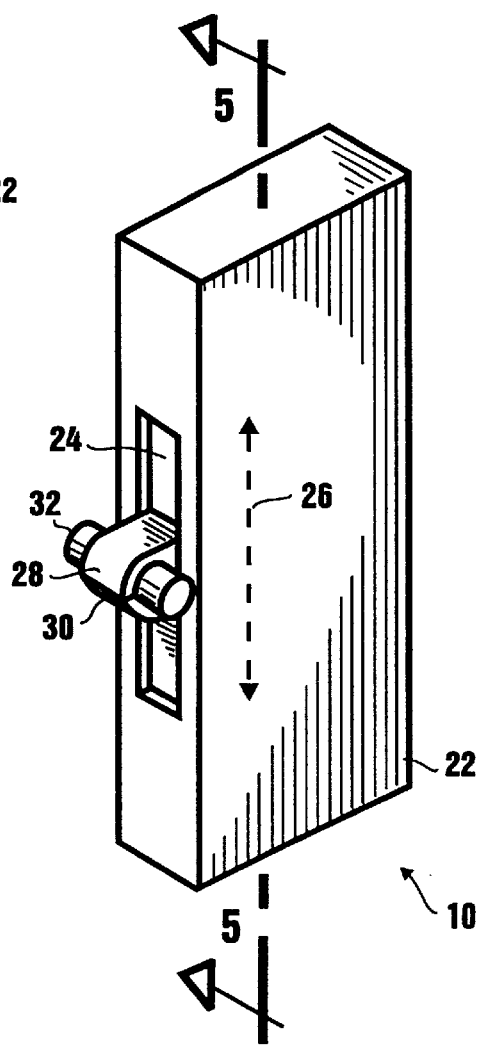
FIG. 3 is an isometric view of the gripper of FIG. 2 shown in a closed configuration.

The structural details of the present invention may be more easily appreciated with reference to FIGS. 2 and 3. In FIGS. 2 and 3, it may be seen that the gripper 10 includes a housing 22 which has a substantially rectangular shape. The housing 22 is formed with a slot shaped, housing aperture 24 which is positioned along an axis of translational movement, shown as arrow 26. FIGS. 2 and 3 also show that the gripper 10 includes a first grip 28 and a second grip 30 both of which extend through the housing aperture 24.

The cooperation of first grip 28 and second grip 30 may be better appreciated by comparison of FIG. 2 and 3. In FIG. 2, the gripper 10 is shown positioned in an open configuration with first grip 28 and second grip 30 positioned apart along the axis of translational movement 26. The open configuration of FIG. 2 allows the gripper 10 to be moved around a cylindrical component 32 and to grasp the cylindrical component 32 between the first grip 28 and second grip 30. In the open configuration, the grips 28, 30 can be moved around irregularly shaped components and/or components which are not properly positioned. In FIG. 3, the gripper 10 is shown in a closed configuration in which first grip 28 and second grip 30 are proximate to each other. The closed configuration of FIG. 3 allows the gripper 10 to hold cylindrical component 32 between first grip 28 and second grip 30 during movement of the gripper 10 by the machine 12.

Figure 4:
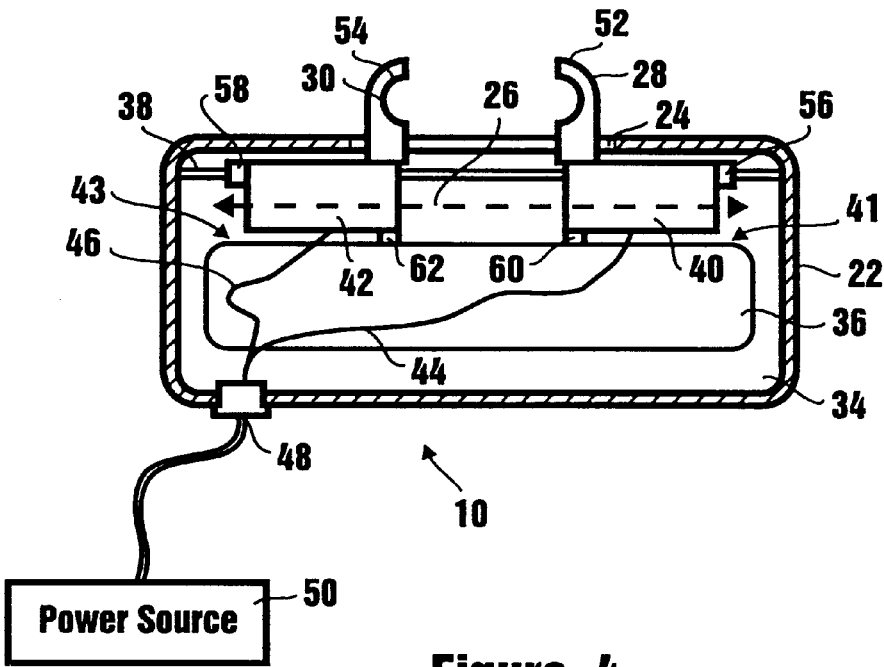
FIG. 4 is a cross-sectional view of the gripper taken on line 4—4, in FIG. 2.
Figure 5:
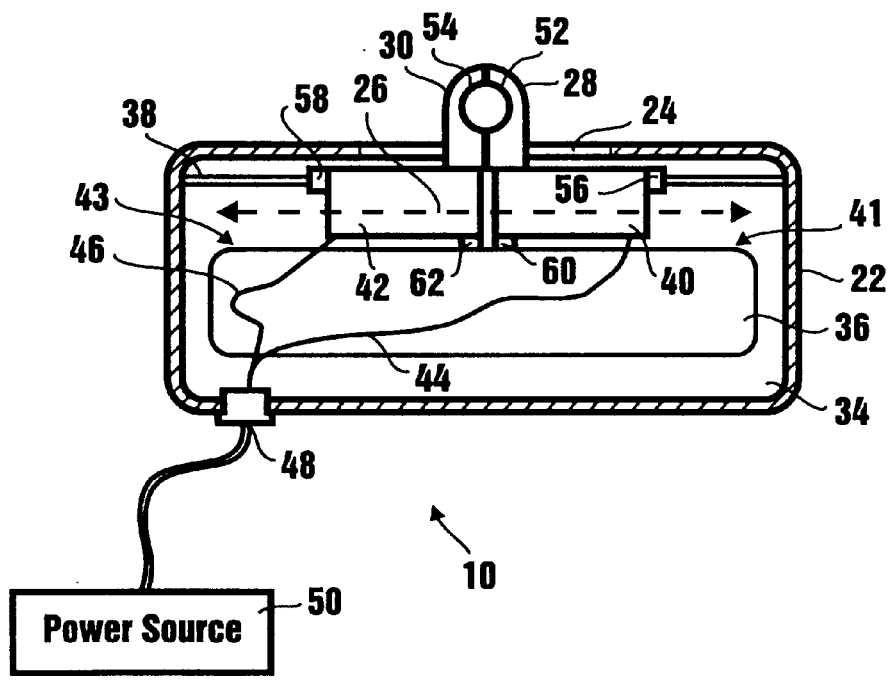
FIG. 5 is a cross-sectional view of the gripper taken on line 5—5, in FIG. 3.

The structural details which allow the gripper 10 of the present invention to move between the open configuration of FIG. 2 and the closed configuration of FIG. 3 are better appreciated by reference to FIGS. 4 and 5. In FIGS. 4 and 5 it may be seen that housing 22 is formed to include a chamber 34 and that a housing magnet 36 is positioned within the chamber 34. Functionally, the housing magnet 36 establishes a housing magnetic field within the chamber 34 which is aligned to be substantially parallel with the axis of translational movement 26. In the embodiment shown in the Figures, the housing magnetic field is stationary relative to the housing 22. It should be appreciated that many different types of magnets, including electromagnetic types, may be employed as the housing magnet 34. For example, the housing magnet 36 can be an oblong, rare earth type magnet which is dimensioned to substantially span the length of the chamber 34 and be substantially parallel with the axis of translational movement 26. Alternately, the housing magnet 36 can be a pair of magnets positioned within the chamber 34 along the axis of translational movement 26.

FIGS. 4 and 5 also show that the present invention includes a rail 38 or guide mounted within the chamber 34 of the housing 22. The rail 38 is linear and substantially parallel with the axis of translational movement 26. The first grip 28 and second grip 30 are shown to be partially contained with chamber 34 and to partially project from the housing aperture 24. The portion of first grip 28 and second grip 30 that is contained within chamber 34 allows first grip 28 and second grip 30 to be slidingly mounted on rail 38. The sliding mount of first grip 28 and second grip 30 on rail 38 allows first grip 28 and second grip 30 to move translationally over the rail 38 along axis of translational movement 26 to grip the component 14. Alternately, for example, the first grip 28 and the second grip 30 can be mounted on separate, substantially parallel rails (not shown).

Continuing with FIGS. 4 and 5, it may be seen that the gripper 10 of the present invention also includes a first electromagnetic coil 40 positioned within chamber 34 and attached to the first grip 28. The combination of the first electromagnetic coil 40 and the housing magnet 36 forms a first linear voice coil actuator 41. Similarly, the gripper 10 of the present invention includes a second electromagnetic coil 42 positioned within chamber 34 and mounted on second grip 30. The combination of the second electromagnetic coil 42 and the housing magnet 36 forms a second linear voice coil actuator 43.

The first electromagnetic coil 40 and second electromagnetic coil 42 are connected by wiring harness 44 and wiring harness 46, respectively, to a controller 48. The controller 48 is connected, in turn, to electrical power source 50. Functionally, the controller 48 directs a separate electric current to each of the first electromagnetic coil 40 and second electromagnetic coil 42. Electrical current passing through the first electromagnetic coil 40 and the second electromagnetic coil 42 causes first electromagnetic coil 40 and second electromagnetic coil 42 to generate a first magnetic field and a second magnetic field, respectively. The magnitude and orientation of the first and second magnetic fields is controllable by the controller 48 with appropriate changes to the magnitude and polarity of the separate electric currents supplied to first electromagnetic coil 40 and second electromagnetic coil 42.

The first and second magnetic fields interact with the housing magnetic field produced by the housing magnet 36. As a result of this interaction, a force is applied to the first electromagnetic coil 40 and, therefore, to the first grip 28. Similarly, a force is applied to the second electromagnetic coil 42 and, therefore, to the second grip 30. The magnitude and orientation of the force applied to the first electromagnetic coil 40 and the force applied to the second electromagnetic coil 42 are adjustable by appropriate changes to the magnitude and polarity of the separate electric currents supplied to first electromagnetic coil 40 and second electromagnetic coil 42. As mentioned above, two separate housing magnets may be used instead of the one shown. In either case, the separate coils 40, 42 establish two separately and individually operable circuits.

Application of the force to the first grip 28 and second grip 30, as just described, allows the first grip 28 and second grip 30 to be moved translationally along the axis of translational movement 26. In particular, a correct application of electric current to first electromagnetic coil 40 and second electromagnetic coil 42 may be used to configure the gripper 10 into the open configuration of FIGS. 2 and 4 or into the closed configuration of FIGS. 3 and 5.

The present invention is amenable to several important adaptations. More specifically, it may be seen in FIGS. 2–6 that the first grip 28 and second grip 30 may be specially shaped to work in combination with a specific component, such a cylindrical component 32. In the case of the gripper 10 shown in FIGS. 2–6, this adaptation takes the form of a first recess 52 included in first grip 28 and a matching, second recess 54 included in second grip 39. The first recess 52 and second recess 54 are dimensioned to be compatibly shaped with the component 32, allowing the gripper 10 to more easily manipulate components of this type and/or shape. It may be appreciated that other shapes for first recess 52 and second recess 54 may be employed when required for other types of components.

Another type of adaptation is the inclusion of a first position sensor 56 shown attached to first electromagnetic coil 40 and a second position sensor 58 shown attached to second electromagnetic coil 42. Functionally, the first position sensor 56 interprets data encoded in rail 38 to determine the position of first electromagnetic coil 40 along the axis of translational movement 26. The first position sensor 56 then produces a first position signal which describes the position of the first electromagnetic coil 40. The first position signal is subsequently passed through wiring harness 44 to controller 48. Similarly, second position sensor 58 interprets data encoded in rail 38 to determine the position of second electromagnetic coil 42 along axis of translational movement 26. The second position sensor 58 then produces a second position signal which describes the position of second electromagnetic coil 42. The second position signal is passed through wiring harness 46 to controller 48. It may be appreciated by one skilled in the art that the position signals produced by first position sensor 56 and second position sensor 58 may be utilized by the controller 48 to more accurately control current to the first electromagnetic coil 40 and the second electromagnetic coil 42 and, thereby, to more accurately control the translational position of first grip 28 and second grip 30. As a result, the position signals can be used to be accurately positioned to the gripper 10 for pick-up and place positions which do not change. It may also be appreciated that there are various methods for encoding the required position data in rail 38 including optical, mechanical and magnetic means.

A third type of adaptation is the inclusion of a first force sensor 60, shown attached to first electromagnetic coil 40 and a second force sensor 62, shown attached to second electromagnetic coil 42. The first force sensor 60 and the second force sensor 62 respectively produce first and second force signals indicating the force being generated by first electromagnetic coil 40 and second electromagnetic coil 42. These force signals are passed via wiring harness 44 and wiring harness 46 to the controller 48. It may be appreciated by one skilled in the art that the force signals produced by first force sensor 60 and second force sensor 62 may be utilized by the controller 48 to more accurately control current to the first electromagnetic coil 40 and the second electromagnetic coil 42 and, thereby, more accurately control the force applied by first grip 28 and second grip 30. For example, a rise of the first force signal above a threshold level can identify when the first grip 28 contacts the component 14. Similarly, a rise of the second force signal above a threshold level can identify when the second grip 30 contacts the component 14. This will allow the present gripper 10 to be used with fragile components.

Figure 7:
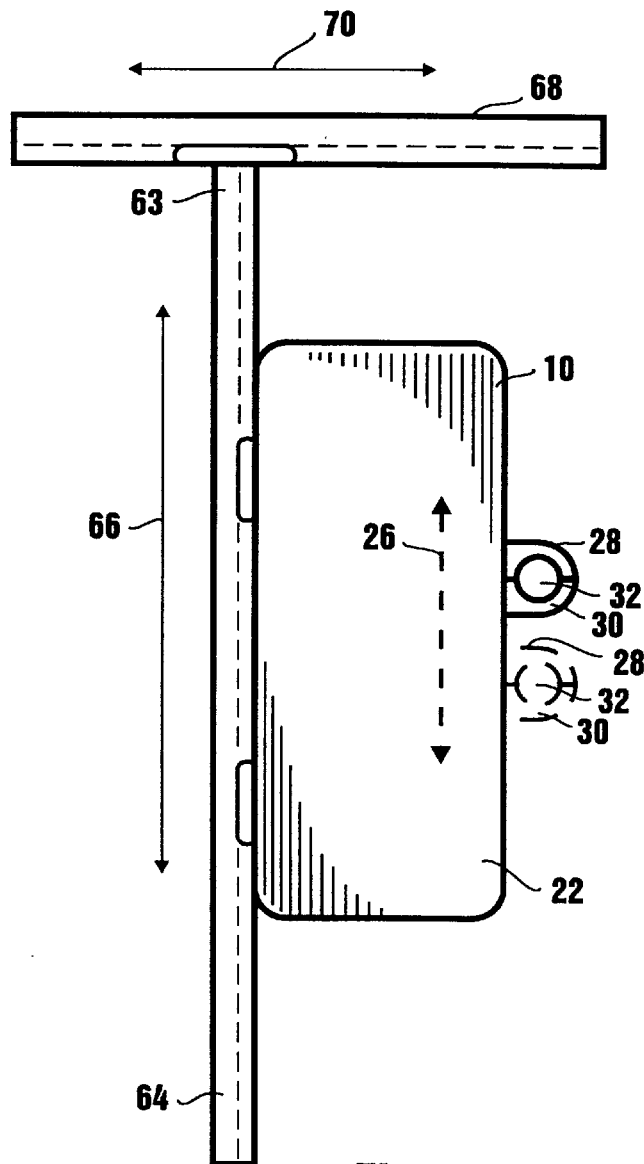
FIG. 7 is a side plan view of the gripper engaged with a transporter.

In an alternate embodiment for the present invention, the gripper 10 can be mounted on a transporter 63 to increase its range of motion. More specifically, as shown in FIG. 7, the gripper 10 can be slidably mounted on a first rail 64 for reciprocal movement of the gripper 10 back and forth in the directions of the arrows 66. This will then allow for an additional range of motion for the gripper 10 in the direction of the axis of translational movement 26. For the purposes of the present invention, the movement of the gripper 10 along the first rail 64 can be accomplished in any manner well known in the pertinent art, such as by a screw drive, an electrical motor or a linear actuator. Additionally, as also shown in FIG. 7, the transporter 63 can include a second rail 68 which is generally oriented perpendicular to the first rail 64. With the first rail 64 mounted for sliding movement along the second rail 68 in directions indicated by the arrows 70, the range of motion for the gripper 10 is further increased. The transporter 63 can include a third rail (not shown), which is perpendicular to both the first rail 64 and the second rail 68. With the second rail 68 slidably mounted on this third rail, in a manner similar to the mounting of first rail 64 on second rail 68, the range of motion for the gripper 10 can be increased to three dimensions. As will be appreciated by the skilled artisan, the actual engagement of first rail 64 with the second rail 68, as well as the drive mechanisms for causing relative movement therebetween, can be accomplished in any of several arrangements, all known in the pertinent art.

OPERATION

Operationally, as shown in FIG. 1, the gripper 10 of the present invention is generally attached to one or more actuators 21 of a machine 12 which allows the gripper 10 to be moved, rotated, and/or repositioned. Under control of the machine 12 the gripper 10, in the open configuration shown in FIGS. 2 and 4, is positioned to place the first grip 28 and second grip 30 on opposite sides of component, such as the cylindrical component 32.

The controller 48 is then used to pass individual electric currents through the first electromagnetic coil 40 and second electromagnetic coil 42. As previously discussed, the electric currents cause the first grip 28 and second grip 30 to move translationally to adopt the closed configuration shown in FIGS. 3 and 5. Importantly, the individual motion of first grip 28 and second grip 30 allows the gripper 10 to compensate for assembly components that have asymmetrical shapes, to compensate for components that have successively varying shapes, and to compensate for improperly positioned components.

The first force sensor 60 and the second force sensor 62 can be utilized during the translational movement of the first grip 28 and/or second grip 30 to adopt the closed configuration. As described above, the first force sensor 60 can be used to constantly monitor the force upon the first grip 28.

When the first force signal from the first force sensor 60 rises above a predetermined threshold, the first grip 28 has contacted the component 14. Similarly, the second force sensor 62 continuously monitors the force upon the second grip 30. When the second force signal from the second force sensor 62 rises above a predetermined threshold, this signals that the second grip 30 has contacted the component 14. This feature can prevent over application of force to a fragile component 14.

Further, it is important to recognize that the first position sensor 58 and the second position sensor 60 can be utilized for pick-up and place positions which do not change. Thus, the first position sensor 58 and second position sensor 60 allow the gripper 10 to precisely pick-up and/or place a component 14.

In the closed configuration, the first grip 28 and the second grip 30 hold the component 32 allowing the actuator 21 to be activated to relocate the gripper 10 and component 32. Also in the closed configuration, the currents applied by the controller 48 to the first electromagnetic coil 40 and the second electromagnetic coil 42 may be selectively altered, if necessary, to change the holding or gripping power of the gripper 10.

Figure 6:
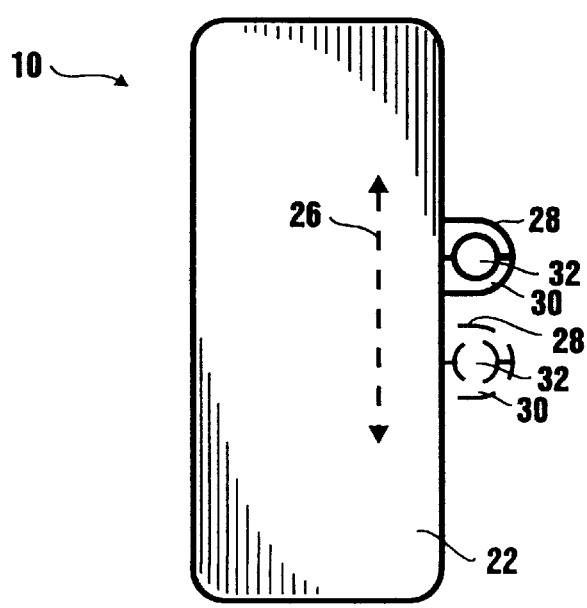
FIG. 6 is a side plan view of the gripper laterally repositioning a component.

Additionally, referring to FIG. 6, the current applied to the first electromagnetic coil 40 and the second electromagnetic coil 42 may be selectively altered to cause the first grip 28 and second grip 30, with the component 32 positioned in-between, to move in concert along the axis of translational movement 26. In this fashion the gripper 10 may provide adjustments to the lateral position of component 32. This allows the gripper 10 to precisely, laterally reposition the component 32.

After the component 32 has reached the desired location, the current applied to the first electromagnetic coil 40 and the second electromagnetic coil 42 by the controller 48 may be selectively altered to cause the gripper 10 to once again adopt the open configuration of FIGS. 2 and 4, releasing the component 32.

While the particular gripper 10 for use with a machine 12 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A gripper for grasping and moving a component which comprises:
   a first electromagnetic means, said first electromagnetic means being activated for moving a first grip into contact with said component;
   a second electromagnetic means, said second electromagnetic means being activated for independently moving a second grip into contact with said component to grasp said component between said first grip and said second grip with a predetermined force; and
   a controller means for operating said first electromagnetic means in concert with said second electromagnetic means to substantially maintain said predetermined force on said component during a movement of said component from a first position to a second position, with said movement of said component resulting from simultaneous activation of said first electromagnetic means and said second electromagnetic means.

2. A gripper as recited in claim 1 wherein said controller activates said first electromagnetic means for moving said first grip and said controller independently activates said second electromagnetic means for moving said second grip.

3. A gripper as recited in claim 1 further comprising:
   a housing;
   a magnetic means mounted on said housing for creating a housing magnetic field;
   a first electrical coil for selectively generating a first magnetic field, said first magnetic field being interactive with said housing magnetic field to establish said first electromagnetic means; and
   a second electrical coil for selectively generating a second magnetic field, said second magnetic field being interactive with said housing magnetic field to establish said second electromagnetic means.

4. A gripper as recited in claim 1 wherein said first position and said second position define a path and said movement of said component along said path is a substantially translational movement.

5. A gripper as recited in claim 4 further comprising:
   a housing;
   a first position sensor mounted on said housing for determining a position of said first grip on said path; and
   a second position sensor mounted on said housing for determining a position of said second grip on said path.

6. A gripper as recited in claim 5 further comprising a transporter for selectively moving said gripper in a first direction substantially parallel to said path and in a second direction substantially perpendicular to said path.

7. A gripper as recited in claim 6 wherein said transporter comprises:
   a first rail, said gripper being slidably mounted on said first rail for movement in said first direction; and
   a second rail, said first rail being slidably mounted on said second rail for movement of said gripper is said second direction.

8. A gripper for grasping and moving a component which comprises:
   a housing;
   a first grip slidably mounted on said housing for substantially reciprocal translation movement along a path;
   a first motor for moving said first grip along said path;
   a second grip slidably mounted on said housing for substantially reciprocal translation movement along a path;
   a second motor for moving said second grip along said path; and
   a controller for activating said first motor to move said first grip into contact with said component, for individually activating said second motor to move said second grip into contact with said component to grasp said component between said first grip and said second grip with a predetermined force, and for concertedly activating said first motor and said second motor to substantially maintain said predetermined force on said component during a movement of said component along said path.

9. A gripper as recited in claim 8 wherein said first motor comprises:
   a magnetic means mounted on said housing for creating a housing magnetic field;
   a first electrical coil for selectively generating a first magnetic field, said first magnetic field being interactive with said housing magnetic field to move said first grip.

10. A gripper as recited in claim 9 wherein said second motor comprises a second electrical coil for selectively generating a second magnetic field, said second magnetic field being interactive with said housing magnetic field to move said second grip.

11. A gripper as recited in claim 10 further comprising:
a first position sensor mounted on said housing for determining a position of said first grip on said path; and
a second position sensor mounted on said housing for determining a position of said second grip on said path.

12. A gripper as recited in claim 11 further comprising a transporter for selectively moving said gripper in a first direction substantially parallel to said path and in a second direction substantially perpendicular to said path.

13. A gripper as recited in claim 12 wherein said transporter comprises:
a first rail, said gripper being slidably mounted on said first rail for movement in said first direction; and
a second rail, said first rail being slidably mounted on said second rail for movement of said gripper is said second direction.

14. A method for using a gripper to grasp and move a component which comprises the steps of:
activating a first electromagnetic means to move a first grip into contact with said component;
independently activating a second electromagnetic means to move a second grip into contact with said component to grasp said component between said first grip and said second grip with a predetermined force; and
operating said first electromagnetic means in concert with said second electromagnetic means to substantially maintain said predetermined force on said component during a movement of said component along a path from a first position on said path to a second position on said path, wherein said movement of said component results from simultaneous activation of said first electromagnetic means and said second electromagnetic means.

15. A method as recited in claim 14 wherein said activating step comprises the steps of:
creating a housing magnetic field; and
selectively generating a first magnetic field with a first electrical coil, with said first grip being mounted on said first electrical coil and said first magnetic field being interactive with said housing magnetic field to move said first grip along said path.

16. A method as recited in claim 15 wherein said independently activating step is accomplished by selectively generating a second magnetic field with a second electrical coil, with said second grip being mounted on said second electrical coil and said second magnetic field being interactive with said housing magnetic field to move said second grip along said path.

17. A method as recited in claim 14 wherein said movement of said component along said path is a substantially translational movement.

18. A method as recited in claim 17 further comprises the steps of:
using a first position sensor for determining a position of said first grip on said path; and
using a second position sensor for determining a position of said second grip on said path.

19. A method as recited in claim 18 further comprising the step of selectively moving said gripper in a first direction substantially parallel to said path and in a second direction substantially perpendicular to said path.

20. A method as recited in claim 19 wherein said moving step is accomplished by mounting said gripper on a first rail for movement of said gripper in said first direction; and mounting said first rail on a second rail for movement of said gripper is said second direction.

* * * * *